(12) United States Patent
LeBlanc

(10) Patent No.: US 11,162,697 B2
(45) Date of Patent: Nov. 2, 2021

(54) AUXILIARY FILTER FOR THE INDOOR UNIT OF A MINI-SPLIT HEAT PUMP

(71) Applicant: Edward Brian LeBlanc, Noonan (CA)

(72) Inventor: Edward Brian LeBlanc, Noonan (CA)

( * ) Notice: Subject to any disclaimer, the term of this patent is extended or adjusted under 35 U.S.C. 154(b) by 155 days.

(21) Appl. No.: 16/602,478

(22) Filed: Oct. 17, 2019

(65) Prior Publication Data

US 2020/0141595 A1 May 7, 2020

Related U.S. Application Data

(60) Provisional application No. 62/766,782, filed on Nov. 5, 2018.

(51) Int. Cl.

| | |
|---|---|
| *F24F 8/10* | (2021.01) |
| *F24F 1/0047* | (2019.01) |
| *F24F 1/0011* | (2019.01) |
| *F25B 13/00* | (2006.01) |
| *F24F 13/28* | (2006.01) |
| *B01D 46/00* | (2006.01) |

(52) U.S. Cl.
CPC ............. *F24F 8/10* (2021.01); *F24F 1/0011* (2013.01); *F24F 1/0047* (2019.02); *F24F 13/28* (2013.01); *F25B 13/00* (2013.01); *B01D 46/002* (2013.01); *B01D 2221/16* (2013.01); *B01D 2267/30* (2013.01); *B01D 2267/70* (2013.01); *B01D 2279/50* (2013.01)

(58) Field of Classification Search
CPC ........ F24F 13/28; F24F 13/085; F24F 1/0073; F24F 1/035; F24F 1/0047; B01D 2279/50; B01D 46/002; B01D 46/125; B01D 2221/16; B01D 2267/30; B01D 2267/70

USPC ....................... 55/385.2, 484, 485
See application file for complete search history.

(56) References Cited

U.S. PATENT DOCUMENTS

| | | | |
|---|---|---|---|
| 1,385,502 | A | 7/1921 | Smith et al. |
| 1,429,811 | A | 9/1922 | Tynan |
| 2,634,718 | A | 4/1953 | Williams |
| 2,974,663 | A | 3/1961 | Humbert |
| 2,988,169 | A | 6/1961 | Klein |

(Continued)

FOREIGN PATENT DOCUMENTS

| | | |
|---|---|---|
| CN | 208671419 | 3/2019 |
| DE | 2921940 | 12/1980 |

OTHER PUBLICATIONS

NPL Document 1: Jay's Custom Creations, Mini Split Filters, Oct. 13, 2019, https://jayscustomcreations.com/2019/10/mini-split-filters/ and https://www.youtube.com/watch?v=S_Li3Z7F8tE&t=1s (Year: 2019).*

(Continued)

*Primary Examiner* — Steve S Tanenbaum
(74) *Attorney, Agent, or Firm* — Mario Theriault

(57) ABSTRACT

The indoor unit of a mini-split heat pump has an auxiliary filter mounted atop the air inlet opening of the indoor unit. The auxiliary filter comprising three parallel filtering stages and each of these filtering stages having an air flow capacity equivalent to a nominal air flow rating of the indoor unit. The three filtering stages improve low-air-quality tolerance of a residential indoor unit of a mini-split heat pump, so that commercial and industrial users can also benefit from these high efficiency heat pumps to reduce their carbon footprint.

9 Claims, 3 Drawing Sheets

(56) References Cited

U.S. PATENT DOCUMENTS

| | | | |
|---|---|---|---|
| 3,127,259 A | 3/1964 | Boylan | |
| 3,348,365 A | 10/1967 | Dupre | |
| 3,391,689 A | 7/1968 | Roger | |
| 3,552,103 A | 1/1971 | Smith | |
| 3,768,235 A | 10/1973 | Meyer | |
| 3,971,877 A | 7/1976 | Lee | |
| 4,659,349 A | 4/1987 | Rodi et al. | |
| 5,147,430 A | 9/1992 | Kidd | |
| 5,176,570 A | 1/1993 | Liedl | |
| 5,240,487 A | 9/1993 | Kung | |
| 5,399,180 A | 3/1995 | Kopp | |
| 5,462,569 A | 10/1995 | Benjamin | |
| 5,689,969 A | 11/1997 | Convoy | |
| 5,720,660 A | 2/1998 | Benedetto et al. | |
| 5,792,230 A | 9/1998 | Moore et al. | |
| D434,486 S | 11/2000 | Segers | |
| 6,447,566 B1 | 9/2002 | Rivera et al. | |
| 6,485,538 B1* | 11/2002 | Toyoshima | B01D 46/521 55/490 |
| 6,623,540 B2 | 9/2003 | Clayton et al. | |
| 6,793,715 B1 | 9/2004 | Sandberg | |
| 6,849,107 B1* | 2/2005 | Huffman | B01D 46/0005 250/436 |
| 7,037,354 B1 | 5/2006 | Dimicelli | |
| D554,245 S | 10/2007 | Geyer, III | |
| 7,805,953 B2 | 10/2010 | Jensen | |
| 8,555,666 B1 | 10/2013 | Pettus | |
| 10,040,149 B2 | 9/2018 | Simmons | |
| 2002/0144513 A1* | 10/2002 | Gunji | F24F 1/0073 62/263 |
| 2011/0155343 A1* | 6/2011 | Boudreau | F24F 13/30 165/10 |
| 2019/0145655 A1* | 5/2019 | Conrad | B01D 46/0005 165/119 |
| 2020/0370768 A1* | 11/2020 | Wennerstrom | B01D 46/46 |

OTHER PUBLICATIONS

NPL Document 2: Choosing the Best Air Filter, Nov. 28, 2017, https://cleanair.camfil.us/2017/11/28/choosing-best-air-filter-important-things-consider/ (Year: 2017).*

NPL Document 3: Mickey Luongo, Mini Split Installation, Mar. 15, 2018, https://blog.totalhomesupply.com/mini-split-installation-tips/ (Year: 2018).*

* cited by examiner

AUXILIARY FILTER FOR THE INDOOR UNIT OF A MINI-SPLIT HEAT PUMP

This patent application claims the benefit of U.S. Provisional Application No. 62/766,782, filed Nov. 5, 2018.

FIELD OF THE INVENTION

This invention pertains to filters for heat pumps, and more particularly it pertains to filters for operating a residential heat pump in a dusty environment.

BACKGROUND OF THE INVENTION

Residential heat pumps, known as ductless mini-split heat pumps, are now associated with high efficiency, cost saving and excellent payback. Residential heat pumps have one or more indoor units that are installed relatively close to the ceiling. Heat pumps use a reverse Carnot™ cycle to extract heat from environmental air, to pump heated fluid into the heat exchangers of the indoor units and to circulate inside air through the heat exchangers.

There is a double purpose for the installation of the indoor units near the ceiling. In addition to heating inside air through the heat exchanger, these units circulate warm air rising to the ceiling through the heat exchangers and force this warm air downward to maintain a homogeneous heat throughout a room.

Residential mini-split heat pumps are designed for homes that are normally relatively clean and free of dust. Their filter screens are made to capture dust and debris carried from outside on residents' clothing, for example. These filter screens must be cleaned periodically to maintain the efficiency of the indoor units. An indoor unit does not operate efficiently in a basement having a woodworking shop for example, or in a garage that is partly converted into a handyman shop. The dust present in these shops exceeds the design tolerance of an indoor unit.

Similarly, these indoor units of mini-split heat pumps do not operate well in commercial establishments with heavy foot traffic, in manufacturing environments or in buildings located at remote locations, where periodic maintenance is difficult to schedule.

For these reasons, it is believed that there is a need in the heating industry for an auxiliary filter that can be mounted to an indoor unit of a mini-split heat pump to allow these units to operate efficiently in commercial and industrial environments. A search in the prior art has given a few results of auxiliary filters for heat exchangers, but none of these filters can be used without a complete redesign of modern mini-split indoor units.

The following documents represent an inventory of filters available in the prior art.

U.S. Pat. No. 3,348,365, issued to D. D. Dupre on Oct. 24, 1967;
U.S. Pat. No. 3,971,877, issued to L. Y. Lee on Jul. 27, 1976;
U.S. Pat. No. 4,659,349, issued to A. Roti et al., on Apr. 21, 1987;
U.S. Pat. No. 5,462,569, issued to S. Benjamin on Oct. 31, 1995;
U.S. Pat. No. 5,689,969, issued to M. Conroy on Nov. 25, 1997;
U.S. Pat. No. 6,623,540, issued to R. L. Clayton on Sep. 23, 2003;
U.S. Pat. No. 7,805,953, issued to T. A. Jensen on Oct. 5, 2010;
U.S. Pat. No. 8,555,666, issued to N. E. Pettus on Oct. 15, 2013;

Because of the limited space between the ceiling and the top of an indoor unit, the installations found in the prior art do not offer any suggestion to improve air filtration on an indoor unit of a mini-split heat pump.

Although the inventions of others deserve undeniable merits, there continues to be a need for an improved auxiliary filter for installation on indoor heat exchangers of mini-split heat pumps.

SUMMARY OF THE PRESENT INVENTION

In the present invention, there is provided an indoor unit of a mini-split heat pump and an auxiliary filter mounted atop an air inlet opening of the indoor unit. The auxiliary filter is comprised of three parallel filtering stages and each of these filtering stages has an air flow capacity equivalent to a nominal air flow rating of the indoor unit.

In another aspect of the present invention, there is provided an indoor unit of a mini-split heat pump comprising an auxiliary filter mounted atop an air inlet opening of the indoor unit. The indoor unit has a casing and the filtering stages of the auxiliary filter are incorporated inside that casing, so that the auxiliary filter and the indoor unit are part of a same apparatus.

In another aspect of the present invention, there is provided a method for improving low-air-quality tolerance of a residential indoor unit of a mini-split heat pump, comprising the steps of: installing three stages of filtration in parallel above an air inlet opening of the indoor unit, wherein, each of the filtering stages has an air flow capacity equivalent to a nominal air flow capacity of the indoor unit.

The indoor unit with an auxiliary filter mounted thereon can be installed in commercial and industrial environments with unpredictable air quality. Because of this auxiliary filter, commercial and industrial users can also benefit from these high efficiency heat pumps to reduce their carbon footprint.

It will be appreciated that whether the auxiliary filter is installed on indoor units in industrial plants, businesses or residences, the additional filtration implies a positive health benefit to people served.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

Two preferred embodiments of the auxiliary filter according to the present invention are described herein with the aid of the accompanying drawings, in which like numerals denote like parts throughout the several views.

Figure 1:
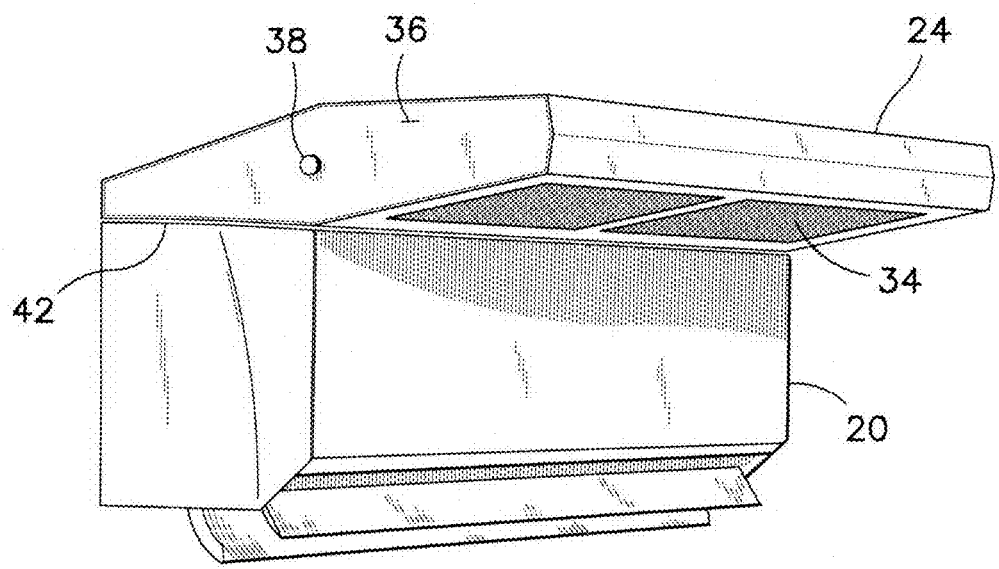
FIG. 1 is a perspective representation of an indoor heat exchanger of a mini-split heat pump with the first preferred auxiliary filter installed thereon.

The drawings presented herein are presented for convenience to explain the functions of all the elements included in the preferred embodiments of the present invention. Elements and details that are obvious to the person skilled in the art may not have been illustrated. Conceptual sketches have been used to illustrate elements that would be readily understood in the light of the present disclosure. These drawings are not fabrication drawings, and should not be scaled.

DESCRIPTION OF THE PREFERRED EMBODIMENTS

Referring firstly to FIGS. 1-4, the space "A" available between the top of an indoor unit 20 and a ceiling 22 is usually about 4½ inches to 6 inches or more. The first preferred auxiliary filter assembly 24 has a shape of a visor sitting on the top of the indoor unit 20. The first preferred filter 24 has a total height "B" that is less than the available space "A". In the first preferred embodiment the height "B" is about 4¼ inches. The first preferred filter assembly 24 has a back portion overlapping the opening of the filter screen 28 of the indoor unit 20, and a front portion overhanging the front door 30 of the indoor unit 20, without preventing an operation of the front door.

The first preferred auxiliary filter 24 slides over the top of the indoor unit 20 and covers the air intake opening of the indoor unit 20 completely. The first preferred auxiliary filter 24 is retained on top of the indoor unit 20 by gravity or by magnetic tape, Velcro™ strips or similar attachment. Preferably, the center of gravity 32 of the first preferred auxiliary filter 24 is such that the auxiliary filter 24 remains on the indoor unit 20 without requiring any fastener.

Many methods can be used to move the center of gravity 32 toward the wall side of the indoor unit 20. Such methods may include adding ballast to that part of the first preferred auxiliary filter 24, or adding an accessory such as a handle for example, or air flow or temperature instrumentation.

Figure 2:
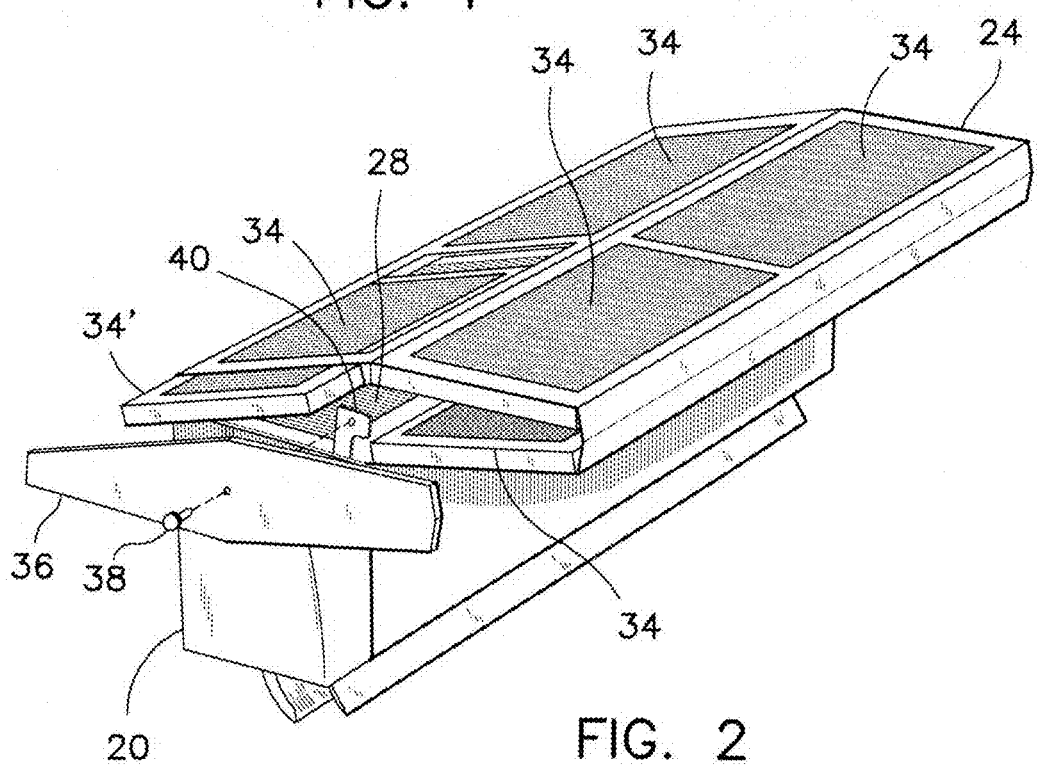
FIG. 2 is a perspective top, end and front side of the first preferred auxiliary filter with one end cap removed and one filter panel partly withdrawn from its seat.
Figure 3:
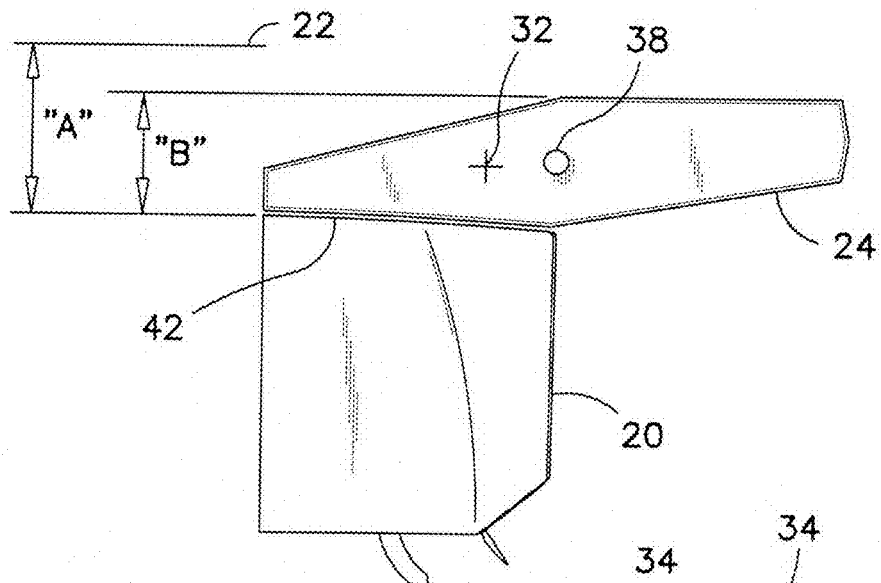
FIG. 3 is an end view of an indoor unit with the first preferred auxiliary filter mounted thereon.

Referring especially to FIG. 2, the first preferred auxiliary filter 24 contains three filter panels 34 mounted in a parallel flow. A removable end cap 36 provides access to these filter panels 34 for the purpose of cleaning or replacing these filter panels. Panel 34' is shown partly pulled out from its seat for the purpose of illustrating a replacement motion. Filter panels 34 can extend the full width of the auxiliary filter 24 or extend half the width, with another set of filter panels being installed from the opposite end of the filter unit 24. A second end cap 36 can be provided on that opposite end to provide access to this other set of filter panels 34.

The end cap 36 is preferably retained to the casing of the auxiliary filter 24 by a thumb screw 38, attaching to a tab 40 on the casing. Other methods can be used to retain the end cap 36 or both end caps 36 to the casing of the first preferred auxiliary filter 24.

Figure 4:
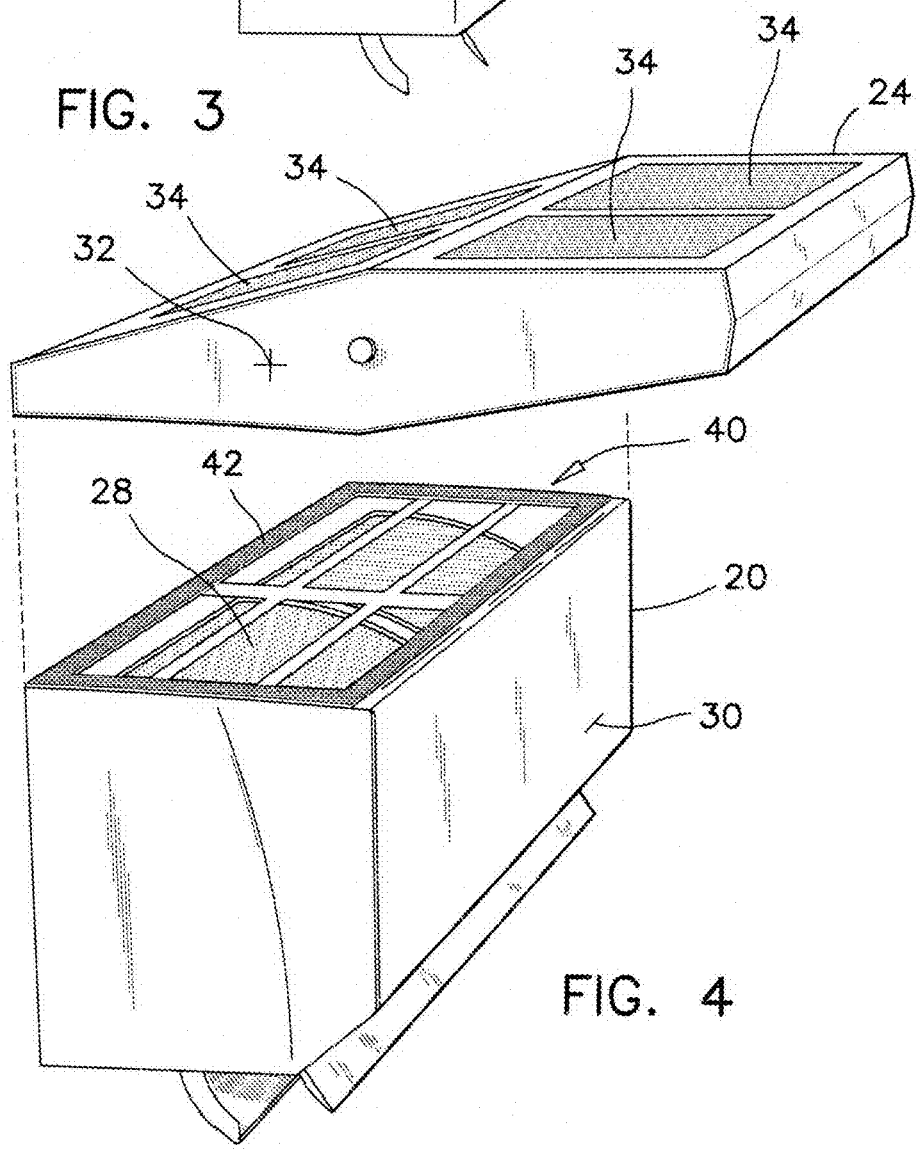
FIG. 4 illustrates an exploded view of the indoor unit and the first preferred auxiliary filter.

Referring now to FIG. 4, it will be appreciated that the preferred auxiliary filter 24 covers the air inlet opening 40 to the inlet screen 28 of the indoor unit 20 completely. Each filter panel 34 has a width that is equivalent to the width of the inlet opening 40 and a length that is either the full length of the inlet opening 40 or half the length such that two filter panels 34 mounted end to end covers the air inlet opening 40 completely. All filter panels 34 in the first preferred auxiliary filter 24 have a same surface area.

The strip 42 illustrated around the air inlet opening 40 of the indoor unit 20 represents a magnetic strip or simply a strip of material having a smooth surface to afford easy sliding of the auxiliary filter 24 over the indoor unit 20. The strip 42 preferably has sealing properties to prevent air leakage around the air inlet opening 40. The sealing strip 42 may be installed around the air inlet opening 40 of the indoor unit 20 or around the discharge opening 44 of the first preferred auxiliary filter 24, as can be seen in FIG. 5.

Figure 5:
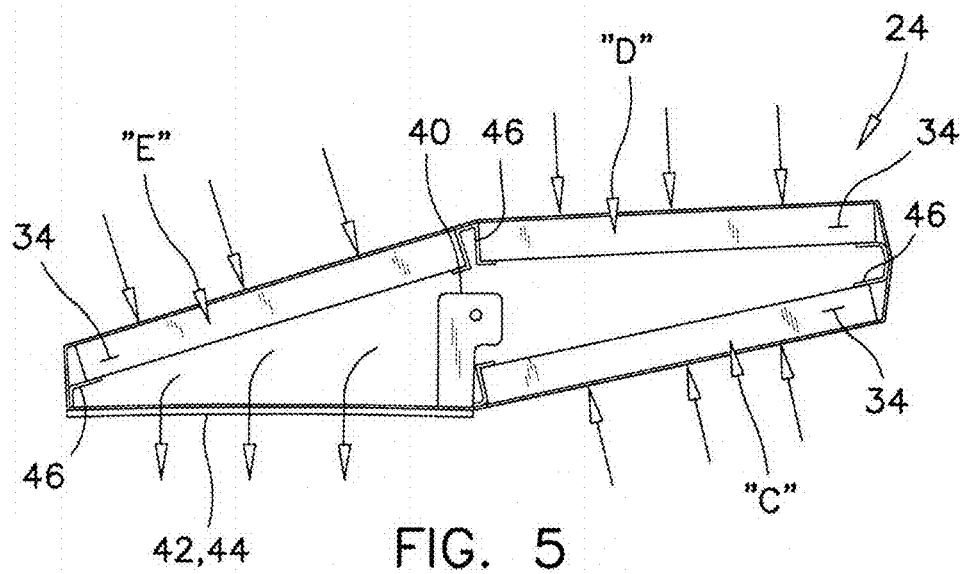
FIG. 5 illustrates parallel air flows through the first preferred auxiliary filter.

As can also be seen in FIG. 5, each filter panel 34 or each pair of filter panels 34 is mounted in a respective position and retained in place in slides 46 formed inside the casing of the first preferred filter 24. In the first preferred auxiliary filter 24, a pair of filter panels 34 is mounted end-to-end in a first filtering stage "C" to draw air from the front of the indoor unit 20. A second pair of filter panels 34 is mounted end-to-end and located above the first pair in a second filtering stage "D" parallel to the ceiling above the indoor unit 20, drawing warm air from the ceiling region. A third pair of filter panels 34 is mounted end-to-end in a third filtering stage "E" above the air inlet opening 44 of the indoor unit 20, and also drawing warm air from the ceiling region. Although pairs of filter panels 34 are mentioned herein, longer filter panels extending the full length of the air inlet opening 44 may be used.

Whether pairs of filter panels 34 or full-length filer panels 34 are used, each of filtering stages "C"; "D"; "E" has a surface area that is equivalent to the air inlet opening 40 of the indoor unit 20. It will be appreciated that filtering stages "C"; "D"; "E" are mounted in parallel air flows. Each filter panels 34 is preferably made of pleated filter fabric to ensure that the filter panels 34 at each stage "C"; "D"; "E" has an air flow capacity that is larger than the CFM rating of the air inlet screen 28 of the indoor unit. Because the filtering stages "C"; "D"; "E" are mounted in parallel, the air flow capacity of the first preferred auxiliary filter 24 is three times as large as the air flow capacity (CFM) of the air inlet screen 28 in the indoor unit 20.

An indoor unit of a mini-split heat pump having the first preferred auxiliary filter 24 mounted thereon can be operated efficiently in an environment which is three times as dusty as a residential apartment.

Because of the auxiliary filter 24, mini-split heat pumps can be used in commercial and industrial environments that were considered impossible before. Low-cost heat can be made available to these commercial and industrial users to reduce their carbon foot print. Examples of these commercial and industrial users are: churches, shopping malls, control rooms and locker rooms of mills, manufacturing plants, office buildings, and power distributions substations. The increased availability of mini-split heat pumps also include applications such as unmanned weather stations, lighthouses and forest fire watch towers, where preventive maintenance visits are far apart.

Figure 6:
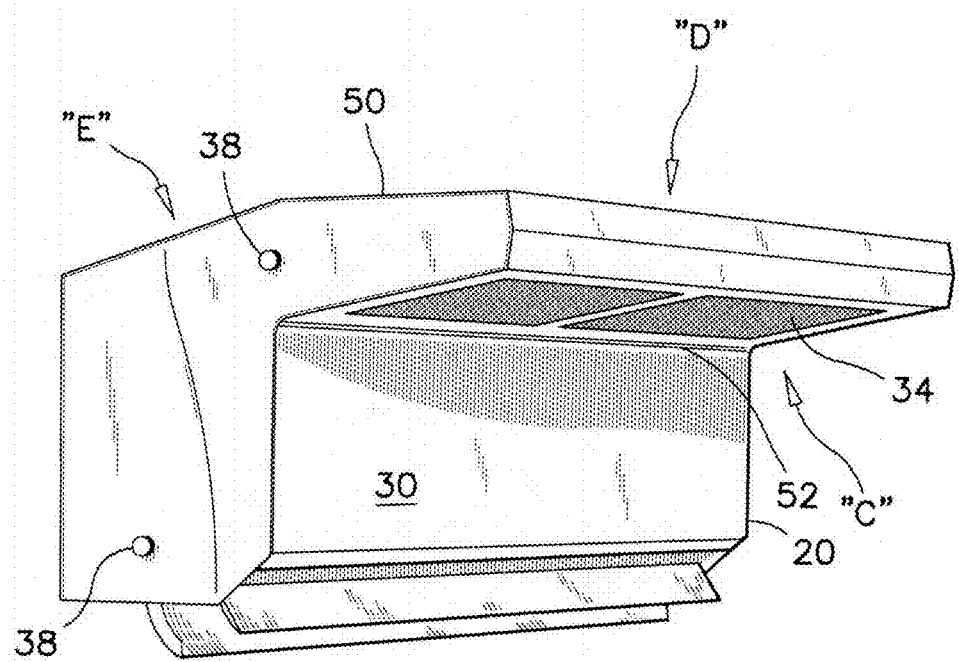
FIG. 6 is a perspective view of a second preferred embodiment of the auxiliary filter incorporated in the casing of an indoor unit of a mini-split heat pump.

Referring now to FIG. 6, the auxiliary filter 50 according to the second preferred embodiment will be explained. In the second preferred embodiment, all three filtering stages "C"; "D"; "E" (not shown) are incorporated in a same casing as the heat exchanger and fan of the indoor unit. 20. The filter panels 34 of filtering stages "C" and "D" extend over the door 30 of the indoor unit 20. The door 30 of the indoor unit is preferably hinged on hinge 52 below the filtering stage "C". The door 30 provides access to the filtering screen 28 of the indoor unit 20, for periodically cleaning the screen 28.

While two embodiments of the present invention has been illustrated in the accompanying drawings and described herein above, it will be appreciated by those skilled in the art that various modifications, alternate constructions and equivalents may be employed. Therefore, the above description and illustrations should not be construed as limiting the scope of the invention, which is defined in the appended claims.

What is claimed is:

1. In combination, an indoor unit of a mini-split heat pump mounted at a predetermined distance from a ceiling of an indoor space, and an auxiliary filter mounted atop an air inlet opening of said indoor unit, said auxiliary filter comprising two parallel filtering stages wherein each of said filtering stages having an air flow capacity equivalent to an air flow rating of said indoor unit, and wherein one of said filtering stages faces said ceiling and one of said filtering stages faces downward, in front of said indoor unit.

2. The combination as claimed in claim 1, further comprising a third filtering stages, wherein all said filtering stages are mounted in different planes.

3. The combination as claimed in claim 2, wherein each of said filtering stages comprising pleated filtering fabric.

4. The combination as claimed in claim 2, wherein said auxiliary filter comprising filter panels; an end cap and longitudinal guides therein, and said filter panels being mounted in said guides and movably replaceable through said end cap.

5. The combination as claimed in claim 2 wherein two of said filtering stages face said ceiling.

6. The combination as claimed in claim 2, wherein two of said filtering stages overhanging a front portion of said indoor unit.

7. The combination as claimed in claim 6, wherein said two of said filtering stages overhanging a front portion of said indoor unit, comprising one of said two filtering stages facing upward and another one of said two filtering stages facing downward.

8. The combination as claimed in claim 6, wherein said air inlet opening extending at six inches below said ceiling and said auxiliary filter having a total vertical thickness of 4¼ inch above said air inlet opening.

9. A method for improving low-air-quality tolerance of a residential indoor unit of a mini-split heat pump, comprising the steps of: installing two filtering stages in parallel above an air inlet opening of said indoor unit, wherein each of said filtering stages having an air flow capacity equivalent to an air flow capacity of said indoor unit, and one of said filtering stages faces upward, and further comprising the step of directing a downward air flow and an upward air flow through said filtering stages.

* * * * *